(12) United States Patent
O'Connor et al.

(10) Patent No.: US 8,236,364 B2
(45) Date of Patent: Aug. 7, 2012

(54) ROLLED SHEET OF COOKIE DOUGH

(75) Inventors: Christine O'Connor, Rogers, MN (US);
James Fischer, Coon Rapids, MN (US);
Michael D. Engesser, Coon Rapids, MN (US)

(73) Assignee: General Mills Marketing, Inc., Minneapolis, MN (US)

( * ) Notice: Subject to any disclaimer, the term of this patent is extended or adjusted under 35 U.S.C. 154(b) by 1126 days.

(21) Appl. No.: 11/408,507

(22) Filed: Apr. 21, 2006

(65) Prior Publication Data
US 2006/0263504 A1    Nov. 23, 2006

Related U.S. Application Data

(60) Provisional application No. 60/673,411, filed on Apr. 21, 2005.

(51) Int. Cl.
*A21D 10/00* (2006.01)

(52) U.S. Cl. .................................. 426/549; 426/557

(58) Field of Classification Search .................. 426/132, 426/497
See application file for complete search history.

(56) References Cited

U.S. PATENT DOCUMENTS

| | | | |
|---|---|---|---|
| 2,586,945 A | 2/1952 | Harrel et al. | |
| 3,222,189 A | 12/1965 | Perrozzi | |
| 3,692,535 A | 9/1972 | Norsby et al. | |
| 4,297,378 A | 10/1981 | Haasl et al. | |
| 4,372,982 A | 2/1983 | Haasl et al. | |
| 4,777,057 A * | 10/1988 | Sugisawa et al. | 426/412 |
| 5,270,065 A | 12/1993 | Schanno | |
| 5,595,778 A | 1/1997 | Huang et al. | |
| 6,838,105 B2 | 1/2005 | Finkowski et al. | |
| 2003/0118684 A1 * | 6/2003 | Finkowski et al. | 425/208 |
| 2004/0058036 A1 * | 3/2004 | Murty et al. | 426/95 |
| 2005/0153023 A1 * | 7/2005 | Overton | 426/94 |
| 2005/0238780 A1 * | 10/2005 | Norquist et al. | 426/549 |
| 2006/0110493 A1 * | 5/2006 | Schnieber et al. | 426/93 |

FOREIGN PATENT DOCUMENTS

WO    WO 2004/032635 A2    4/2004

OTHER PUBLICATIONS

Shirl, Freezing cookie Dough, http://www.recipelink.com, date posted Nov. 11, 1998 pp. 2. Link:http://www.recipelink.com/mf/0/75139.*
Sarah Phillips, Make ahead pie crusts, http://recipelink.com, date posted Nov. 16, 1999, pp. 2 Link: http://recipelink.com/mf/0/9678.*
Feb. 23, 2005, *Baking 911.com—Rolled & Cut-Out Cookies: Step-by-Step*.

* cited by examiner

*Primary Examiner* — Jyoti Chawla
(74) *Attorney, Agent, or Firm* — John L. Crimmins; Aleya Champlin (57) ABSTRACT

Methods and formulations for forming a rolled cookie dough configuration for shipment, display and storage. The rolled configuration can be frozen and/or refrigerated and be subsequently unrolled prior to use. The cookie dough can be formulated so as to unroll into a flat sheet configuration without cracking, breaking and/or sticking together. When unrolled, the flat sheet configuration can be sliced/cut with cookie cutters to create specially shaped cookie units for baking. Excess dough can be trimmed and rerolled for further cutting with a cookie cutter.

9 Claims, 6 Drawing Sheets

ROLLED SHEET OF COOKIE DOUGH

REFERENCE TO RELATED APPLICATION

This application claims the benefit of priority under 35 U.S.C. 119(e)(1) of a provisional patent application, Ser. No. 60/673,411, filed Apr. 21, 2005, which is incorporated herein by reference in its entity.

FIELD OF THE INVENTION

The invention relates to cookie dough and more particularly to rolled cookie dough sheets for easy preparation of cookie units for baking by a consumer.

BACKGROUND OF THE INVENTION

Refrigerated and/or frozen cookie dough products are readily available for purchase and use by consumers. Refrigerated and/or frozen cookie dough products are available in a wide variety of configurations such as, for example, extruded logs of cookie dough, scored cookie dough pads and individualized cookie dough units or pucks. Examples of representative frozen and refrigerated cookie dough products includes the cookie dough products presently available from companies such as General Mills, Inc., of Golden Valley, Minn. and The Nestle Company of Vevey, Switzerland.

One popular, traditional cookie baking application is to cut sheets of sugar cookie dough with cookie cutters to make desirable, shaped cookies such as, for example, Christmas trees during the Christmas season. Cookie cutters are then pressed into the cookie dough to cut-out the desired shape. These cut cookie units could then be further decorated by adding candy, sprinkles, or other flavorants prior to baking.

BRIEF SUMMARY OF THE INVENTION

While the currently available refrigerated and frozen cookie dough products described above provide some ease and convenience to users, there is still room for greater convenience of dough products for consumers, particularly those consumers that enjoy and desire adding a "personal touch" to a home baked process. Furthermore, there is currently no cost-effective method for producing, shipping and storing a pre-rolled sheet of cookie dough for use at the customer's discretion, such as, for example, cutting out shapes with cookie cutters.

The embodiments of the invention described below are not intended to be exhaustive or to limit the invention to the precise forms disclosed in the following detailed description. Rather, the embodiments are chosen and described so that others skilled in the art may appreciate and understand the principles and practices of the invention.

In a representative embodiment, (refrigerated and frozen) cookie dough is rolled from a flat sheet configuration wherein the flat sheet can be rolled into a rolled up configuration for shipment, display and storage. The rolled configuration can be frozen and/or refrigerated and be subsequently unrolled prior to use. The rolled configuration can be unrolled to provide a flat sheet configuration without cracking and/or sticking. When unrolled, the flat sheet can be sliced/cut with cookie cutters or other cutting implements to create specially shaped cookie units for baking. Excess dough can be trimmed and rerolled for further cutting with a cookie cutter.

In another representative embodiment, a cookie dough can be formulated so as to allow a flat sheet of dough to be rolled into a rolled-up configuration that can subsequently be unrolled without sticking to itself or suffering structurally such as, for example, suffering dough cracking and/or breaking. The sugar cookie dough can be formulated to include an anti-tackifier agent to substantially minimize or eliminate dough stickiness during the rolling and unrolling process. An anti-tackifier agent can, among other things, scavenge excess water to reduce the stickiness of the cookie dough. Representative anti-tackifier components can comprise powdered sugar, rice flour, wheat starch or a gum ingredient such as, for example, Xantham gum.

In another representative embodiment, methods for preparing a high sugar content, sheeted undeveloped dough are described. In one aspect, mixing methods to produce a high sugar content, sheeted undeveloped dough can be conducted to form a dense cookie dough as opposed to a traditional "airy" cookie dough. In one representative embodiment, the dense cookie dough can be prepared by elimination of the traditional creaming process wherein air is whipped into a mixture of sugar and shortening and instead, performing a rapid mixing process under vacuum so as to avoid whipping air into the dough. In another aspect, mixing methods to produce a high sugar content, sheeted undeveloped dough can comprise a multi-stage mixing process distinguished by mixing rates such as high shear mixing stages having mixing rates from about 450 rpm to about 1200 rpm and lower shear mixing stages operating at mixing rates from about 125 rpm to about 350 rpm.

Manufacturing doughs at commercial volumes and speeds can be used to make the doughs described herein. In one aspect, rolling a high sugar content, sheeted undeveloped dough can comprise dusting the dough sheet with a hydroscopic agent such as, for example, corn starch and/or rice flour, to prevent sticking of the dough and to act as a moisture barrier between dough surfaces when the dough is in a rolled-up configuration. In another aspect, a high sugar content, sheeted undeveloped dough can be rolled into a flat dough sheet using a staged series of rollers to achieve a desired sheet thickness from about 2.5 mm to about 15 mm in thickness. Finally, the high sugar content, sheeted undeveloped dough can be formed into a rolled-up configuration through the use of a drag chain that causes a leading edge of a dough sheet to be captured while the remaining portion of the dough sheet slides below the leading edge such that the dough sheet assumed a rolled-up configuration.

In another representative embodiment, a rolled-up sheet of cookie dough can be formed through a process comprising the steps of mixing a cookie dough composition, forming a flat dough sheet configuration and rolling the flat dough sheet configuration into a rolled-up dough configuration.

The above summary of the various representative embodiments of the invention is not intended to describe each illustrated embodiment or every implementation of the invention. The figures in the detailed description that follow more particularly exemplify these embodiments.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE PREFERRED EMBODIMENTS

Figure 1:
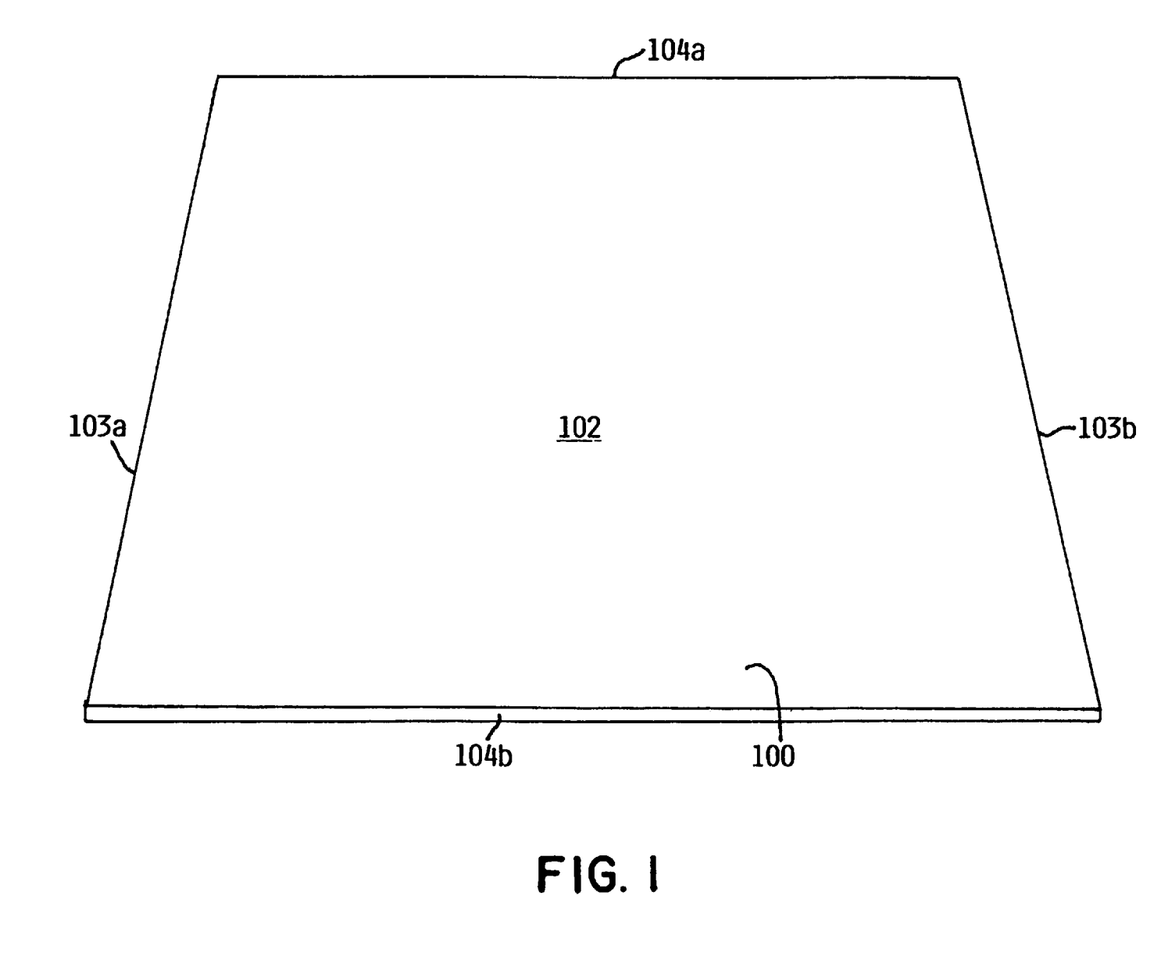
FIG. 1 is a perspective view of a flat dough sheet configuration.
Figure 2:
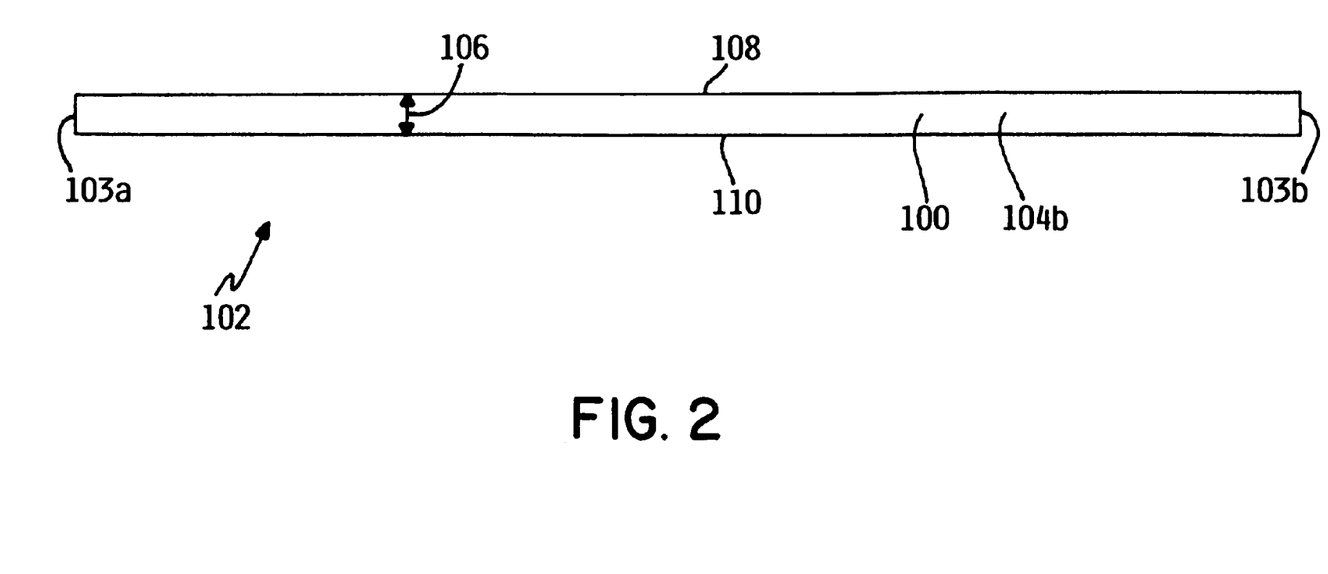
FIG. 2 is a side view of the flat dough sheet configuration of FIG. 1.

As illustrated in FIGS. 1 and 2, a cookie dough 100 can be rolled flat and formed into a flat sheet configuration 102 defined by first edges 103a, 103b and second edges 104a, 104b. In one representative embodiment, first edges 102a, 102b can have a length of about 10 inches while second edges 104a, 104b can have a length of about 11.5 inches. Flat sheet configuration 102 can have a generally uniform sheet thickness 106 defining a first major surface 108 and a second major surface 110. Sheet thickness 106 can range from about 1 mm to about 15 mm in thickness and most preferably ranging from about 4 mm to about 6 mm in thickness.

Cookie dough 100 can comprise a refrigerated and/or frozen cookie dough suitable for storage and subsequent baking by a consumer. Cookie dough 100 can comprise any suitable cookie dough formulation such as, for example, a sugar cookie dough, having appropriate formulations and dough characteristic as discussed below. Alternatively, cookie dough 100 can be high-sugar content refrigerated and/or frozen doughs such as, for example, brownie and/or bar style doughs.

Figure 3:
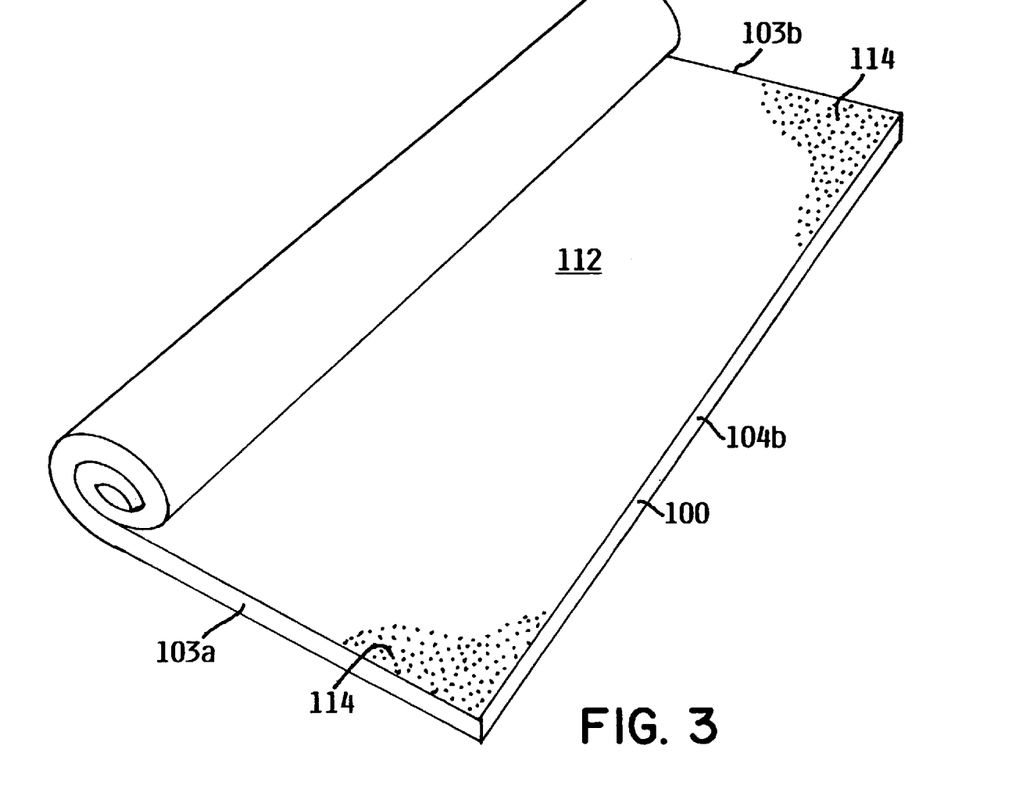
FIG. 3 is a perspective view of a partially rolled-up dough sheet configuration.
Figure 4:
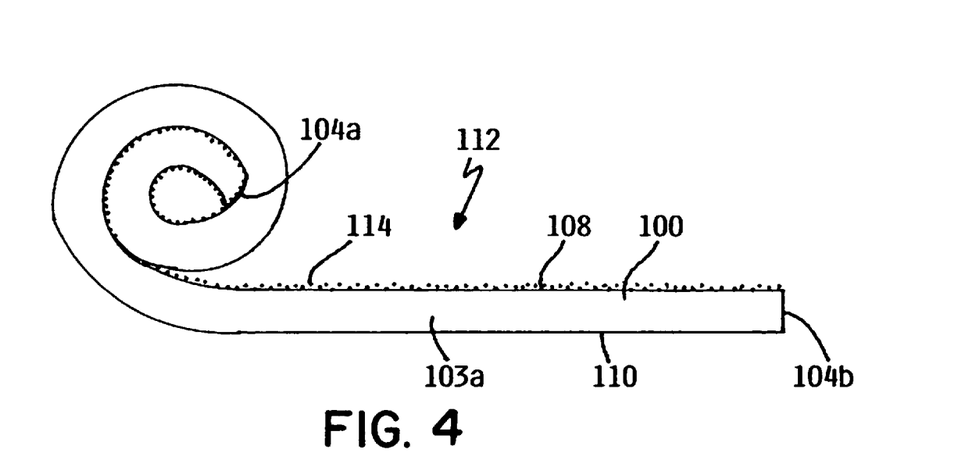
FIG. 4 is an end view of the partially rolled-up dough sheet configuration of FIG. 3.

As illustrated in FIGS. 3 and 4, second edge 104a can be directed toward second edge 104b to initiate a rolling process for forming a partially rolled-up dough sheet 112. Prior to rolling, first major surface 108 can be dusted with a suitable hydroscopic agent 114. This can prevent surface 108 and surface 110 from sticking together as partially rolled-up dough sheet 112 is formed. Hydroscopic agent 114 can function as a moisture scavenger to effectively reduce sticking between surface 108 and surface 110. In one representative embodiment, hydroscopic agent 114 can comprise rice flour having an average moisture content from about 8% by weight to about 14% by weight, or an average moisture content of about 12% by weight.

Figure 5:
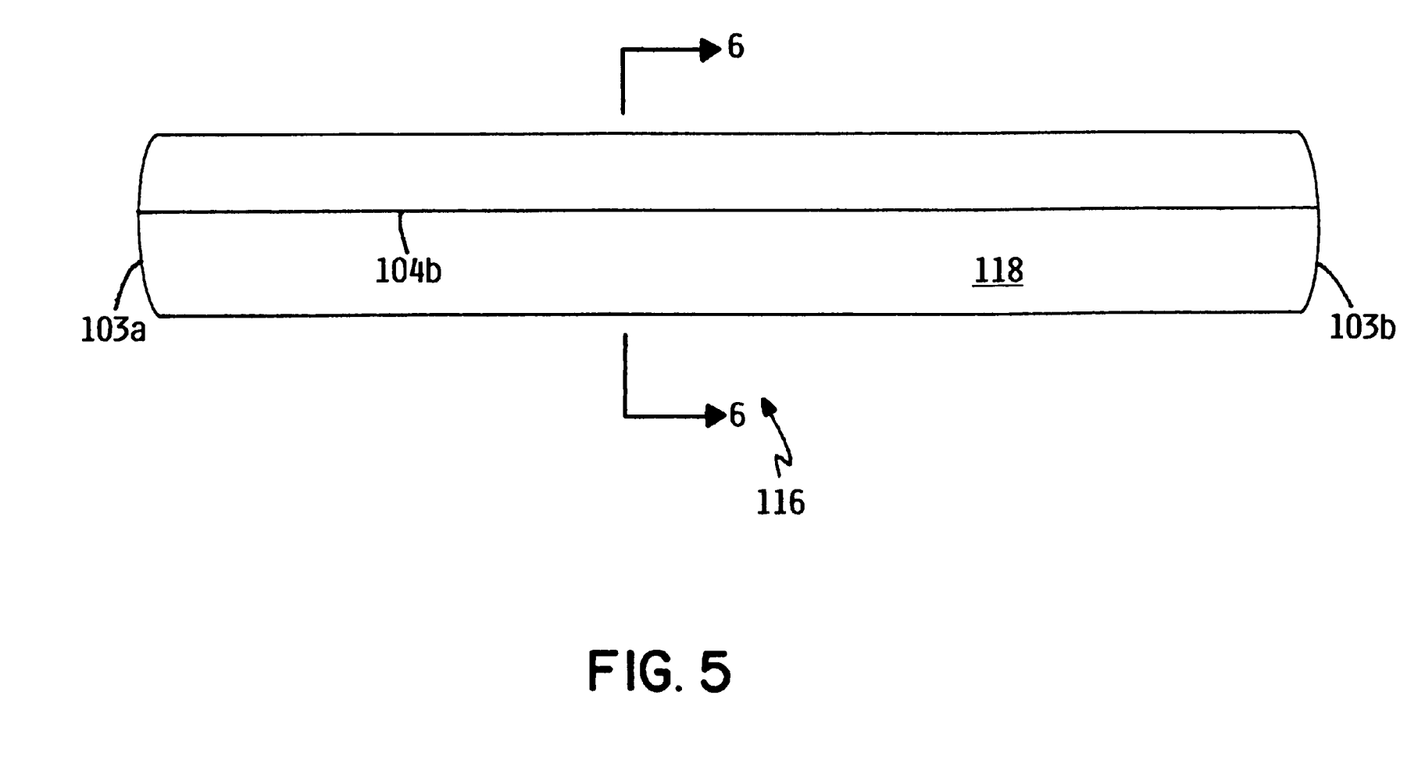
FIG. 5 is a side view of a rolled-up dough sheet configuration.
Figure 6:
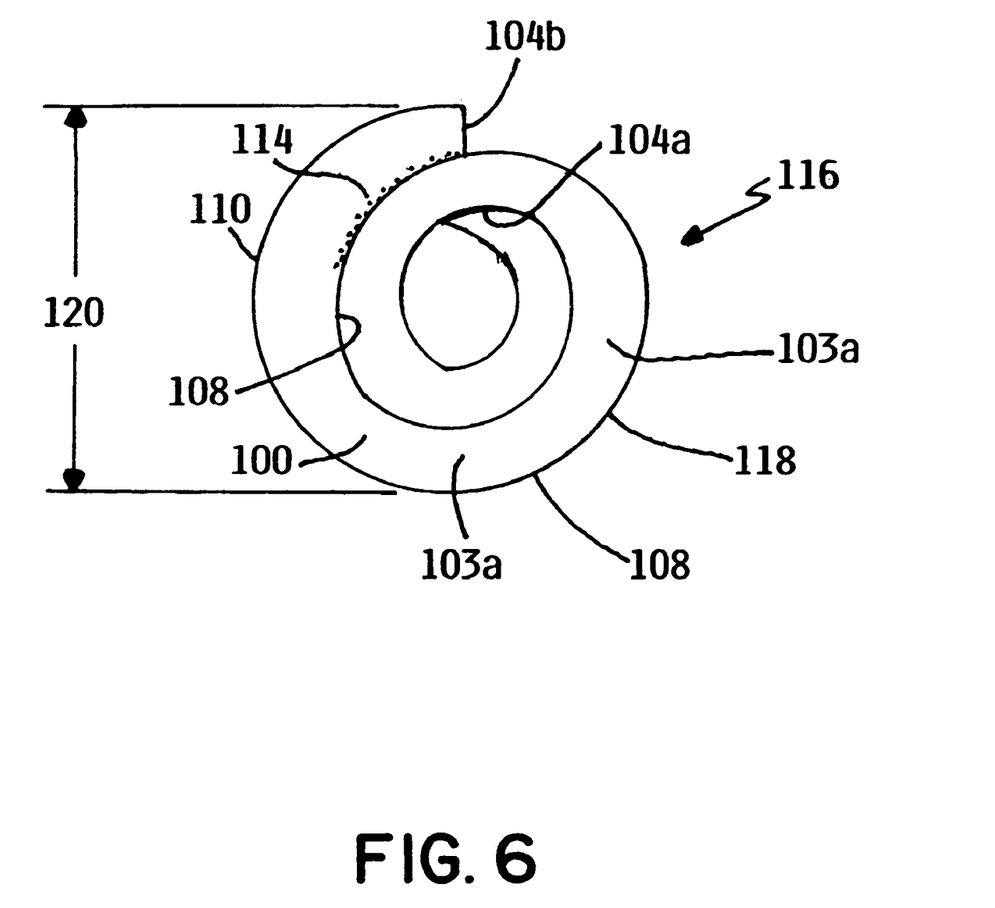
FIG. 6 is a section view of the rolled-up dough sheet configuration of FIG. 5 taken at line 6-6 of FIG. 5.

As illustrated in FIGS. 5 and 6, continued rolling of partially rolled-up dough sheet 112 results in the formation of a rolled-up dough sheet configuration 116 having a generally uniform and substantially circular cross-section 118. Cross-section 118 can have a diameter 120 that can range from about 27 mm to about 66 mm, and more preferably about 30 mm. As illustrated in FIG. 5, second edge 104b remains exposed on an exterior rolled-up perimeter surface 122.

Representative formulations for cookie dough 100 according to this description can be high sugar content dough compositions that are adapted for refrigerated or frozen storage while rolled up without a slip liner or other form of plastic or paper sheet inserted between dough surfaces. A rolled up cookie in accordance with embodiments of the invention can be stored for at least about 60 days at refrigerated temperatures, and still be unrolled without substantial damage. Furthermore, the inventive cookie dough in rolled configuration can be stored at freezing temperatures for at least 90 days. In some embodiments, frozen storage can be followed by refrigeration storage, and such rolled-up cookie dough can still be unrolled without substantial damage. Unrolling can be conducted at room temperature. Such rolled-up dough compositions are capable of being removed from refrigerated or frozen storage and used to produce a flat dough sheet configuration by unrolling followed by individual cookie formation steps such as, for example, cutting, forming, shaping, and combining the dough with other ingredients as appropriate or desired. Suitable rolled-up dough compositions can be formulated such that the rolling and subsequent unrolling of the rolled-up dough compositions structurally survive the rolling and unrolling manipulation it may undergo, e.g., the rolled-up dough compositions minimize potential cracks and/or breakage during any rolling or unrolling. Certain details of the following description are directed to "sugar cookie" doughs. "Sugar cookies" are generally known in the art as cookies made with butter (or margarine or shortening), sugar, eggs, flour, baking powder, salt, and vanilla, but can include other flavor notes; (see www.wikipedia.com). Although sugar cookies can be baked and consumed in circular form, sugar cookies are most known for being rolled out into sheets from which shapes are cut. They generally do not include particulates within the dough itself, but can be topped or decorated with icing, sprinkles, and other decorations. It is to be understood, however, that other high sugar content dough such as, for example, alternatively flavored doughs such as peanut butter flavored cookie dough and other doughs such as, for example, brownie and/or bar-style doughs, that would be advantageously configured in a rolled-up sheet configuration, can be produced similarly.

Suitable dough formulations, and the ingredients they contain, can differ depending on the processing method and the finished product the dough formulation is to be used for. However, most cookie doughs generally have a number of ingredients in common, examples of which are described and illustrated in more detail below.

Suitable cookie doughs will generally contain a grain constituent that contributes to the structure of the dough. Different grain constituents lend different texture, taste and appearance to a baked good. Flour is the most commonly used grain constituent in baked goods, and in most baked foods is the primary ingredient.

Suitable flour types include hard wheat flour, soft wheat flour, corn flour, high amylose flour, low amylose flour, and the like. For example, a dough product made with a hard wheat flour will generally have a more coarse texture than a dough made with a soft wheat flour, due to the presence of a higher amount of gluten in hard wheat flour. In one representative embodiment, a desirable flour type comprises conventionally milled, soft red winter flour having a moisture content of about 12.5% by weight to about 13.6% by weight and most and in a further embodiment, about 13.0% by weight to about 13.2% by weight.

In addition, a suitable cookie dough can comprise wheat starch in addition to the flour. Wheat starch can provide additional advantageous structure qualities to the cookie dough such as, for example, improved elasticity and plasticity that will positively effect the ability to roll and unroll cookie dough. Wheat starch can provide additional functional characteristics advantageous for use in rolling and unrolling dough including acting as a lubricant and binding moisture. Wheat starch generally comprises processed flour that has undergone further processing to reduce the protein content to less than about 0.5% and to remove (to nothing above a trace amount) any non-starch components such as, for example, gluten. Suitable cookie doughs can comprise effective amounts of wheat starch ranging from about 5% by weight to about 30% by weight of the cookie dough.

Suitable cookie doughs can include leavening agents that increase the volume and alter the texture of the final baked cookie. Exemplary leavening agents include, but are not limited to, chemical leavening agents.

Chemical leavening typically involves the interaction of at least one leavening acid and at least one leavening base. The leavening acid generally triggers the release of carbon dioxide from the leavening base upon contact with moisture. The carbon dioxide gas aerates the dough or batter during mixing and baking to provide a light, porous cell structure, fine grain, and a texture with a desirable appearance and palatability.

Sodium bicarbonate, or baking soda, a leavening base, is the primary source of carbon dioxide gas in many chemical-leavening systems. This compound is stable and relatively inexpensive to produce. Other leavening bases include for example potassium bicarbonate, ammonium carbonate and ammonium bicarbonate.

Leavening bases can be modified in order to alter the way in which they work. For example, they can be encapsulated. Encapsulated leavening bases, such as encapsulated baking soda, will tend to delay the onset of the leavening reaction because the encapsulating material must dissolve before the leavening reaction can occur.

Generally, suitable cookie doughs can utilize modified or non-modified leavening bases as part of a chemical leavening system. Specifically, however, one representative embodiment of a suitable cookie dough utilizes non-encapsulated leavening bases as part of the chemical leavening system.

Leavening acids include sodium or calcium salts of ortho, pyro, and complex phosphoric acids in which at least two active hydrogen ions are attached to the molecule. Baking acids include compounds such as monocalcium phosphate monohydrate (MCP), monocalcium phosphate anhydrous (AMCP), sodium acid pyrophosphate (SAPP), sodium aluminum phosphate (SALP), dicalcium phosphate dehydrate (DPD), dicalcium phosphate (DCP), sodium aluminum sulfate (SAS), glucono-delta-lactone (GDL), and potassium hydrogen tartrate (cream of tartar).

Suitable cookie doughs can also contain additional ingredients. Some such additional ingredients can be used to modify the texture of dough. Texture modifying agents can improve many properties of the dough, such as viscoelastic properties, plasticity, or dough development. One representative example of a texture modifying agent includes fats. Cookie doughs can also include flavorings such as sweeteners, spices, and specific flavorings such as bread or butter flavoring. Representative examples of sweeteners include, for example, regular and high fructose corn syrup, sucrose (cane or beet sugar), dextrose and peanut butter. In addition to flavoring the baked good, sweeteners such as sugar can increase the moisture retention of a baked good, thereby increasing its tenderness. Flavorings can also comprise particulate ingredients such as, for example, whole and bit portions of candies, chocolate chips, nuts, fruit and the like.

Another ingredient in formulating a suitable cookie dough is shortening. Shortening helps to improve the volume, grain and texture of the final product. Shortening also has a tenderizing effect and improves overall palatability and flavor of a baked good. Suitable shortenings can be selected from natural shortenings including animal fats such as lard, vegetable based shortenings or synthetic shortenings. Generally, shortening is comprised of triglycerides, fats and fatty oils made predominantly of triesters of glycerol with fatty acids. Fats and fatty oils useful in producing shortening include cotton seed oil, ground nut oil, soybean oil, sunflower oil, rapeseed oil, sesame oil, olive oil, corn oil, safflower oil, palm oil, palm kernel oil, coconut oil, or combinations thereof.

Another dough ingredient for the formulation of cookie doughs suitable for use in the production of rolled cookie sheet configuration is sugar. Through the use of sugar having suitable characteristics, such as, for example, desired granulation sizes, cookie dough can be formulated to substantially reduce and/or eliminate dough stickiness by acting as a moisture scavenger and keeping the cookie dough drier. In one representative dough formulation, powdered sugar can be used in combination with sucrose so as to provide desirable taste, texture, and appearance while simultaneously reducing and/or eliminating dough stickiness.

In one representative dough formulation, powdered sugar having a particle size distribution wherein less than about 2% of powdered sugar particles are retained by a 100 mesh screen and more than 90% of the powdered sugar particles pass through a 200 mesh screen, can be employed to assist in reducing dough stickiness and to further promote the ability to unroll the rolled cookie dough configuration.

Another dough ingredient for use in a representative dough formulation can comprise an anti-tackifier agent to substantially minimize or eliminate dough stickiness during the rolling and unrolling process. By minimizing and/or eliminating dough stickiness, advantages such as, for example, easier and more reliable processing of the dough as well as user friendly characteristics such as eliminating cracking and or sticking during unrolling by an end user can be realized. An anti-tackifier agent can, among other things, scavenge excess water to reduce the stickiness of the cookie dough. Representative anti-tackifier components can comprise powdered sugar, rice flour, wheat starch or a gum ingredient such as, for example, Xantham gum.

In general, a variety of suitable dough formulations are contemplated for the invention. For example, it has been found that cookie doughs can be formulated within the following composition ranges that are suitable for forming cookie dough units and achieving desirable baked cookie units. Representative dough formulations can comprise:

| Ingredient | Weight Percent Range |
| --- | --- |
| Granulated Sugar | 15-35 |
| Shortening | 10-30 |
| Flour | 15-45 |
| Wheat Starch | 10-20 |
| Baking Powder | 0.5-1.0 |
| Water | 4-15 |
| Whole Egg Solids | .2-2.0 |
| Powdered Sugar | 2-10 |
| Flavor | 0.1-2.0 |

As used through the present disclosure, percentages and ratios are calculated by weight unless otherwise indicated. In addition, all percentages and ratios, based on weight or otherwise, are calculated based on the total composition unless otherwise stated. Within the aforementioned composition ranges, a variety of specific formulations are contemplated. The invention is now illustrated in greater detail by way of the following specific examples, but it should be understood that the invention is not to be construed as being limited thereto.

Figure 7:
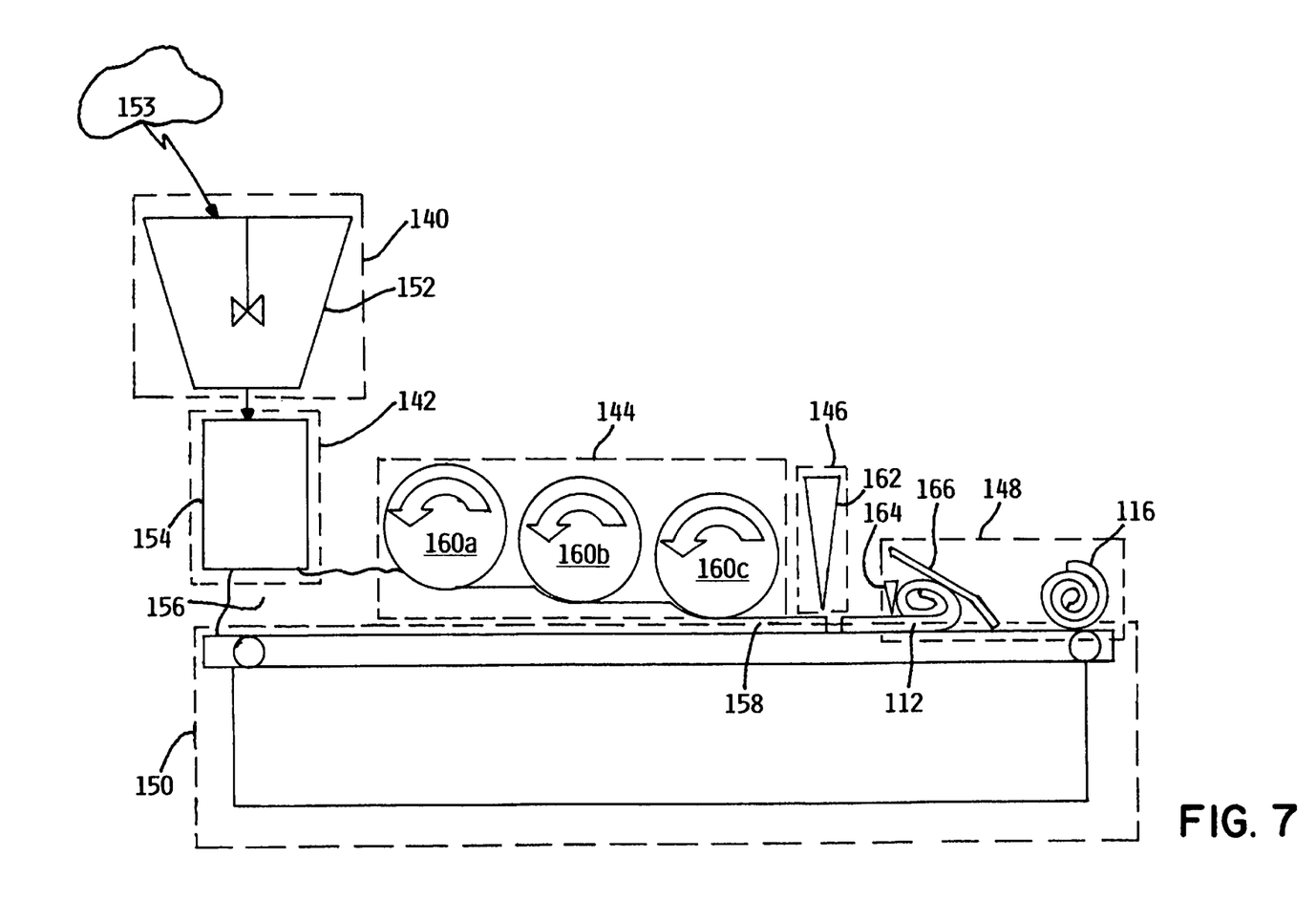
FIG. 7 is a process flow diagram for preparing the rolled-up dough configuration of FIG. 5.

A representative process for forming rolled-up dough sheet configuration 116 is illustrated in FIG. 7. Generally, the process can comprise a series of operational steps including a mixing stage 140, an extrusion stage 142, a sheet forming stage 144, a cutting stage 146 and a rolling-up stage 148. As shown in FIG. 7, the process of forming rolled-up dough sheet configuration 116 can be accomplished utilizing a transport mechanism 150 such as, for example, a conveyorized system as disclosed in U.S. Pat. No. 6,838,105 to Finkowski et al., which is herein incorporated by reference to the extent not inconsistent with the present disclosure.

Mixing stage 140 generally utilizes a mixer 152 to combine and mix a formulation of dry and wet ingredients 153 to form cookie dough 100. Mixer 152 can comprise a variety of suitable mixers selected for characteristics such as shear rates and mixing rates (measured in revolutions per minute "RPM's). Representative mixers 152 can comprise, for example, Stephan or Shaffer dough mixers. In one embodiment, mixer 152 can comprise a vacuum mixer to promote the formation of a dense cookie dough as opposed to mixing in air/oxygen to form a light/airy dough. Depending upon the dough formulation and desired product characteristics, mixing stage 140 can be varied based on mix times, ingredient addition and mix rates. Various illustrative examples contemplated for mixing stage 140 are described in the following example table.

Illustrative Table I: Illustrative Example for Mixing Stage 140

| Ingredient | Ingredient Temperature | Mix Variables 1 Time | Mix Variables 1 rpm | Mix Variables 2 Time | Mix Variables 2 rpm | Mix Variables 3 Time | Mix Variables 3 rpm |
|---|---|---|---|---|---|---|---|
| Stage 1 | | 30 seconds | 490 | 30 seconds | 720 | 30 seconds | 1200 |
| Sugar | 60-90° F. | | | | | | |
| Lard | 120° F. | | | | | | |
| Stage 2 | | 30 seconds | 490 | 30 seconds | 720 | 30 seconds | 1200 |
| Baking Powder | 60-80° F. | | | | | | |
| Flour | 65° F. | | | | | | |
| Wheat Starch | 65° F. | | | | | | |
| Slurry | | | | | | | |
| Water | 30-40° F. | | | | | | |
| Powdered Sugar | 60-90° F. | | | | | | |
| Whole Egg Solids | 60-80° F. | | | | | | |
| Flavor | | | | | | | |
| Stage 3 | | 30 seconds (with vacuum) | 137 | 30 seconds (with vacuum) | 200 | 30 seconds (with vacuum) | 350 |
| FINAL DOUGH | 45-60° F. | | | | | | |

Extrusion stage 142 can comprise any suitable process for converting the bulk dough mixed and formed in mixing stage 140 into a dough configuration suitable for further processing. In some instances, extrusion stage 142 can comprise extruding a bulk cookie dough 156 comprising cookie dough 100 with an extruder 154. Extruder 154 can comprise a suitable, representative extruder known in the field of food processing such as, for example, extruders supplied by Bepex GmBh of Leingarten, Germany, Robert Reiser & Co. of Canton, Mass., and Albert Handtmann Holding Gmbh & Co. KG of Biberbach, Germany. In other instances, extrusion stage 142 can comprise a lapping process, either individually or in combination with an extrusion process, for forming a continuous sheet of cookie dough 100.

As cookie dough 100 exits the extrusion stage 142, bulk cookie dough 156 is conveyed for further processing with transport mechanism 150. Transport mechanism 150 directs the bulk cookie dough 156 through the sheet forming stage 144 wherein bulk cookie dough 156 is formed into a continuous flat sheet 158. Sheet forming stage 144 can comprise a single roller or a plurality of rollers, for example roller 160a, 160b, 160c as illustrated in FIG. 7, for forming continuous flat sheet 158 having the desired uniform sheet thickness 106. As illustrated in FIG. 7, rollers 160a, 160b, 160c can be configured with sequential rolling heights, i.e., largest rolling height to smallest rolling height, so as to promote desirable processing characteristics such as, for example, processing speed, throughput and consistency.

As cookie dough 100 exits the sheet forming stage 144, continuous flat sheet 158 substantially resembles the flat sheet configuration 102 with the exception of continuous flat sheet 158 being continuous. Continuous flat sheet 158 is then conveyed with transport mechanism 150 to the cutting stage 146. Within cutting stage 146, a cutting member 162 cuts and/or slices the continuous flat sheet 158 into a series of continuous flat sheet 158. Cutting member 162 can comprise any cutting instrument suitable for use with cookie dough 100 such as, for example, a wire cutter, a cutting knife, an ultrasonic cutter and other suitable cutting instruments used in the field of food processing.

Next, the individual flat sheet configurations 102 are carried by the transport mechanism 150 such that a leading edge of flat sheet configuration 102, described and illustrated herein as being second edge 104a, is caused to wrap back over the flat sheet configuration 102 in rolling-up stage 148 through interaction of the second edge 104a with a preroller assembly 164 so as to form partially rolled-up dough sheet 112. As transport mechanism 150 continues carrying the partially rolled-up dough sheet 112, a drag chain assembly 166 (or other contact or engaging mechanism) contacts the partially rolled-up dough sheet 112 causing additional rolling so as to ultimately form rolled-up dough sheet configuration 116. Upon completion of the rolling process, rolled-up dough sheet configuration 116 can be conveyed by transport mechanism 150 for additional processing such as, for example, freezing and packaging.

Prior to use by a consumer, rolled-up dough sheet configuration 116 can be transported and stored in a frozen state, a refrigerated state and combinations thereof. Through the use of a suitable cookie dough such as, for example, cookie dough 100, rolled-up dough sheet configuration 116 can be stored in frozen and refrigerated states for extended periods without structurally comprising the ability to unroll rolled-up dough sheet configuration 116 to form flat sheet configuration 102 for ultimate use by a consumer. Specifically, rolled-up dough configuration 116 can be unrolled to form flat sheet configuration 102 without experiencing cracking and/or breaking of the cookie dough 100. With respect to storing periods of rolled-up dough sheet configuration 116, frozen storage of up to one hundred twenty days and refrigerated storage of up to sixty days and combinations of said frozen storage and refrigerated storage can be accomplished using cookie dough 100 without experiencing cracking and/or breaking of the cookie dough 100 during unrolling and use. In some representative embodiments, a consumer can allow the rolled-up cookie dough composition to temper, or warm to about room temperature from either a frozen or refrigerated state prior to unrolling to form the flat sheet configuration 102.

A consumer can subsequently cut flat sheet configuration 102 with a cookie cutter or knife, to form one or more cookie dough intermediates for subsequent baking by the consumer. In some instances, excess cookie dough 100 will remain from flat sheet configuration 102 following the use of the cutting instrument by the consumer. This excess cookie dough 100 can be aggregated and hand rolled by the consumer such as, for example, with a rolling pin, so as to allow for additional cutting and forming by the consumer.

Illustrative Example I

A representative embodiment of rolled-up dough sheet configuration 116 was made according to the following composition:

| Ingredient | Weight Percent |
| --- | --- |
| Granulated Sugar | 17.64 |
| Lard | 22.30 |
| Flour | 29.40 |
| Wheat Starch | 12.60 |
| Baking Powder | 0.92 |
| Water | 9.00 |
| Whole Egg Solids | 1.25 |
| Powdered Sugar | 5.89 |
| Flavor | 1.0 |
| | 100% |

The above specified components were mixed in accordance with mixing stage 140, Mix Variable 1 as previously described in Illustrative Table I. The resulting cookie dough 100 was processed according to the previously described operational steps including extrusion stage 142, sheet forming stage 144, a cutting stage 146 and a rolling-up stage 148. Following, rolling-up stage 148, the rolled-up dough sheet configuration 116 was packaged and frozen for a period of 90 days followed by refrigeration for 60 days.

Rolled-up dough sheet configuration 116 was then removed from the refrigerator wherein the packaging was immediately opened and the rolled-up dough sheet configuration 116 was unrolled to form the flat sheet configuration 102 while still at refrigerated temperatures. During unrolling, no cracking or breaking of the cookie dough 100 was visibly observed and flat sheet configuration 102 was cut into representative shapes and figures with a cookie cutter for subsequent baking. The shaped cookie dough 100 was baked in a preheated oven at a temperature of 350° F. for 8-10 minutes. The resulting baked cookie exhibited similar taste, appearance and textural qualities as traditional sugar cookies.

Illustrative Example II

A representative embodiment of rolled-up dough sheet configuration 116 was made according to the following composition:

| Ingredient | Weight Percent |
| --- | --- |
| Granulated Sugar | 30.92 |
| Shortening | 24.61 |
| Flour | 34.15 |
| Albumen | 0.50 |
| Baking Soda | 0.30 |
| Water | 7.08 |
| Whole Egg Solids | 1.01 |
| Salt | 0.54 |
| Creamy Vanilla | 0.27 |
| Enrichment | 0.17 |
| SALP | 0.32 |
| Xanthan gum | 0.13 |
| | 100% |

The above specified components were mixed with a Stephan mixer in accordance with mixing stage 140, Mix Variable 1 as previously described in Illustrative Table I. The resulting cookie dough 100 was processed according to the previously described operational steps including extrusion stage 142, sheet forming stage 144, a cutting stage 146 and a rolling-up stage 148. Following, rolling-up stage 148, the rolled-up dough sheet configuration 116 was packaged and frozen for a period of 90 days followed by refrigeration for 60 days.

Rolled-up dough sheet configuration 116 was then removed from the refrigerator wherein the packaging was immediately opened and the rolled-up dough sheet configuration 116 was unrolled to form the flat sheet configuration 102 while still at refrigerated temperatures. During unrolling, no cracking or breaking of the cookie dough 100 was visibly observed and flat sheet configuration 102 was cut into representative shapes and figures with a cookie cutter for subsequent baking. The shaped cookie dough 100 was baked in a preheated oven at a temperature of 350° F. for 8-10 minutes. The resulting baked cookie exhibited similar taste, appearance and textural qualities as traditional sugar cookies.

Illustrative Example III

A representative embodiment of rolled-up dough sheet configuration 116 was made according to the following composition:

| Ingredient | Weight Percent |
| --- | --- |
| Granulated Sugar | 17.64 |
| Shortening | 22.30 |
| Flour | 41.94 |
| Baking Powder | 0.92 |
| Water | 9.68 |
| Whole Egg Solids | 1.25 |
| Powdered Sugar | 5.89 |
| Vanilla | 0.25 |
| Xanthan Gum | 0.13 |
| | 100% |

The above specified components were mixed with a Stephan mixer in accordance with mixing stage 140, Mix Variable 1 as previously described in Illustrative Table I. The resulting cookie dough 100 was processed according to the previously described operational steps including extrusion stage 142, sheet forming stage 144, a cutting stage 146 and a rolling-up stage 148. Following, rolling-up stage 148, the rolled-up dough sheet configuration 116 was packaged and frozen for a period of 90 days followed by refrigeration for 60 days.

Rolled-up dough sheet configuration 116 was then removed from the refrigerator wherein the packaging was immediately opened and the rolled-up dough sheet configuration 116 was unrolled to form the flat sheet configuration 102 while still at refrigerated temperatures. During unrolling, no cracking or breaking of the cookie dough 100 was visibly observed and flat sheet configuration 102 was cut into representative shapes and figures with a cookie cutter for subsequent baking. The shaped cookie dough 100 was baked in a preheated oven at a temperature of 350° F. for 8-10 minutes. The resulting baked cookie exhibited similar taste, appearance and textural qualities as traditional sugar cookies.

Illustrative Example IV

A representative embodiment of rolled-up dough sheet configuration 116 was made according to the following composition:

| Ingredient | Weight Percent |
| --- | --- |
| Granulated Sugar | 17.64 |
| Shortening | 22.30 |
| Flour | 41.96 |
| Baking Powder | 0.92 |
| Water | 9.55 |
| Whole Egg Solids | 1.25 |
| Powdered Sugar | 5.88 |
| Vanilla | 0.25 |
| Xanthan Gum | 0.25 |
|  | 100% |

The above specified components were mixed with a Stephan mixer in accordance with mixing stage 140, Mix Variable 1 as previously described in Illustrative Table I. The resulting cookie dough 100 was processed according to the previously described operational steps including extrusion stage 142, sheet forming stage 144, a cutting stage 146 and a rolling-up stage 148. Following, rolling-up stage 148, the rolled-up dough sheet configuration 116 was packaged and frozen for a period of 90 days followed by refrigeration for 60 days.

Rolled-up dough sheet configuration 116 was then removed from the refrigerator wherein the packaging was immediately opened and the rolled-up dough sheet configuration 116 was unrolled to form the flat sheet configuration 102 while still at refrigerated temperatures. During unrolling, no cracking or breaking of the cookie dough 100 was visibly observed and flat sheet configuration 102 was cut into representative shapes and figures with a cookie cutter for subsequent baking. The shaped cookie dough 100 was baked in a preheated oven at a temperature of 350° F. for 8-10 minutes. The resulting baked cookie exhibited similar taste, appearance and textural qualities as traditional sugar cookies.

Illustrative Example V

A representative embodiment of rolled-up dough sheet configuration 116 was made according to the following composition:

| Ingredient | Weight Percent |
| --- | --- |
| Granulated Sugar | 17.64 |
| Powdered Sugar | 5.88 |
| Shortening | 22.30 |
| Flour | 41.95 |
| Water | 9.68 |
| Whole Egg Solids | 1.25 |
| Creamy Vanilla | 0.25 |
| Baking Powder | 0.92 |
| Xanthan Gum | 0.13 |
|  | 100% |

The above specified components were mixed with a Stephan mixer in accordance with mixing stage 140, Mix Variable 1 as previously described in Illustrative Table I. The resulting cookie dough 100 was processed according to the previously described operational steps including extrusion stage 142, sheet forming stage 144, a cutting stage 146 and a rolling-up stage 148. Following, rolling-up stage 148, the rolled-up dough sheet configuration 116 was packaged and frozen for a period of 90 days followed by refrigeration for 60 days.

Rolled-up dough sheet configuration 116 was then removed from the refrigerator wherein the packaging was immediately opened and the rolled-up dough sheet configuration 116 was unrolled to form the flat sheet configuration 102 while still at refrigerated temperatures. During unrolling, no cracking or breaking of the cookie dough 100 was visibly observed and flat sheet configuration 102 was cut into representative shapes and figures with a cookie cutter for subsequent baking. The shaped cookie dough 100 was baked in a preheated oven at a temperature of 350° F. for 8-10 minutes. The resulting baked cookie exhibited similar taste, appearance and textural qualities as traditional sugar cookies.

It will thus be seen according to the invention a highly advantageous rolled cookie dough for use by consumers has been disclosed. While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

The invention claimed is:

1. A rolled cookie dough sheet capable of being unrolled at refrigeration temperatures substantially without the sheet cracking, breaking or sticking to itself, comprising:
 a dough mixture comprising about 10% to about 30% by weight fat, about 15% to about 35% by weight granulated sugar, about 15% to about 45% by weight flour and about 2% to about 20% of an anti-tackifying agent comprising powdered sugar;
 the powdered sugar having a particle size distribution wherein less than about 2% of powdered sugar particles are retained by a 100 mesh screen and more than about 90% of the powdered sugar particles pass through a 200 mesh screen; and
 wherein the rolled cookie dough sheet is capable of being unrolled at refrigeration temperatures substantially without cracking or breaking the sheet after at least 90 days of frozen storage followed by at least 60 days of refrigerated storage.

2. The rolled cookie dough sheet of claim 1, wherein the granulated sugar and the powdered sugar are present in the dough at a ratio of about 3:1 by weight percent of granulated sugar to powdered sugar.

3. The rolled cookie dough sheet of claim 1, wherein the anti-tackifying agent additionally comprises xanthan gum at a level ranging from 0.13% to about 0.25% by weight of the dough mixture.

4. The rolled cookie dough composition of claim 1, wherein the rolled cookie dough sheet is capable of being unrolled at refrigeration temperatures substantially without cracking or breaking the sheet following at least 120 days of frozen storage.

5. A method for making a rolled, undeveloped dough comprising:
   providing dough ingredients comprising:
      flour from about 15% to about 45% by weight of the dough;
      fat from about 10% to about 30% by weight of the dough;
      granulated sugar from about 15% to about 35% by weight of the dough; and
      an anti-tackifying agent comprising powdered sugar from about 2% to about 20% by weight of the dough;
   mixing the dough ingredients to form an undeveloped dough mixture;
   sheeting the dough mixture into a dough sheet; and
   rolling the dough sheet to make the rolled, undeveloped dough, wherein the rolled, undeveloped dough is capable of being unrolled at refrigeration temperatures substantially without cracking or breaking the sheet after at least 90 days of frozen storage followed by at least 60 days of refrigerated storage.

6. The method of claim 5, wherein forming the undeveloped dough mixture comprises vacuum mixing dough ingredients to form the undeveloped dough mixture.

7. The method of claim 5, further comprising dusting a surface of the dough sheet with a hygroscopic agent prior to rolling the dough sheet.

8. A ready-for-baking kit comprising:
   a rolled cookie dough sheet for unrolling by a consumer, wherein the rolled cookie dough sheet is made from a dough mixture comprising about 10% to about 30% by weight fat, about 15% to about 35% by weight granulated sugar, about 15% to about 45% by weight flour and about 2% to about 20% of an anti-tackifying agent comprising powdered sugar, the powdered sugar having a particle size distribution wherein less than about 2% of powdered sugar particles are retained by a 100 mesh screen and more than about 90% of the powdered sugar particles pass through a 200 mesh screen; and
   a packaging assembly containing the rolled cookie dough sheet;
   wherein the rolled cookie dough sheet may be unrolled at refrigeration temperatures by the consumer substantially without cracking or breaking the dough sheet after at least 90 days of frozen storage followed by at least 60 days of refrigerated storage.

9. The ready-for-baking kit of claim 8, wherein the packaging assembly provides for refrigerated and frozen storage of the rolled cookie dough sheet.

* * * * *